United States Patent
Dinsmore et al.

(10) Patent No.: US 11,734,414 B2
(45) Date of Patent: Aug. 22, 2023

(54) METHOD AND SYSTEM FOR GENERATING AND ACCESSING GUARD SERVICES FOR SECURE SERVICES AND OPERATIONS THEREOF

(71) Applicant: Renesas Electronics Corporation, Tokyo (JP)

(72) Inventors: Kimberly Dinsmore, Buckinghamshire (GB); Brandon Hussey, Durham, NC (US)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 17/037,426

(22) Filed: Sep. 29, 2020

(65) Prior Publication Data

US 2022/0100844 A1    Mar. 31, 2022

(51) Int. Cl.
*G06F 21/52* (2013.01)
*H04L 9/08* (2006.01)

(52) U.S. Cl.
CPC .......... *G06F 21/52* (2013.01); *H04L 9/0861* (2013.01); *G06F 2221/034* (2013.01)

(58) Field of Classification Search
CPC ... G06F 2221/034; G06F 21/52; H04L 9/0861
See application file for complete search history.

(56) References Cited

U.S. PATENT DOCUMENTS 11,281,605 B2 *   3/2022 Rahman ............. H03K 19/1733
2009/0254572 A1 * 10/2009 Redlich ................. G06Q 10/06

2016/0191246 A1   6/2016 Varadarajan et al.
2017/0228525 A1   8/2017 Wajs et al.
(Continued)

FOREIGN PATENT DOCUMENTS

DE    10 2018 132 970 A1    4/2020

OTHER PUBLICATIONS

Extended European Search Report for EP 21196723.7, dated Jan. 27, 2022, 8 pages.

*Primary Examiner* — Ashokkumar B Patel
*Assistant Examiner* — William B Jones
(74) *Attorney, Agent, or Firm* — Foley & Lardner LLP

(57) ABSTRACT

Example implementations include generating a guard service for a secure service at a secure region of a processing system by detecting a call to a secure service at a secure region of a processing device, obtaining a secure interface associated with the secure service, generating a guard interface based at least partially on the secure interface, generating a guard service based at least partially on the guard interface, locating the guard service at a secure region, and locating the guard interface at a secure address at the secure region. Example implementations also include accessing a secure service at a secure region of a processing system, from an application at a system region of the processing system, by obtaining a service request associated with a secure service, validating a service parameter associated with service request, generating a secure service parameter based at least partially on the service parameter, generating a guard request based at least partially on the secure service parameter, generating a secure request based at least partially on the guard request, and processing the secure request at the secure service.

7 Claims, 4 Drawing Sheets

(56) References Cited

U.S. PATENT DOCUMENTS

| | | |
|---|---|---|
| 2021/0039770 A1 | 2/2021 | Thomas |
| 2021/0377247 A1* | 12/2021 | Nigro ................... H04L 9/3239 |
| 2021/0389946 A1* | 12/2021 | Wilkerson .......... G06F 12/1009 |
| 2021/0397700 A1 | 12/2021 | Stapf et al. |
| 2022/0228886 A1* | 7/2022 | Singh ................ G01C 21/3811 |

* cited by examiner ns, the secure memory 112 and the system memory 122 are integrated into a common memory device.

METHOD AND SYSTEM FOR GENERATING AND ACCESSING GUARD SERVICES FOR SECURE SERVICES AND OPERATIONS THEREOF

TECHNICAL FIELD

The present implementations relate generally to secure processing systems, and more particularly to generating and accessing guard services for secure services and operations thereof.

BACKGROUND

Embedded and portable electronic systems are increasingly complex and are exposed to increasing security risks. In addition, demands for number of use cases for and flexibility of embedded and portable computer systems are increasingly expanding. Embedded and portable computer system are increasingly requested to conduct sensitive operations in a wide variety or scenarios, while also supporting open and flexible application operation. However, conventional systems may not effectively guard sensitive operations from unauthorized operations on an embedded or portable electronic system in sufficiently broad use cases. Thus, a technological solution for secure encryption key generation and management in open and secure processor environments is desired.

SUMMARY

Example implementations include generating a guard service for a secure service at a secure region of a processing system by detecting a call to a secure service at a secure region of a processing device, obtaining a secure interface associated with the secure service, generating a guard interface based at least partially on the secure interface, generating a guard service based at least partially on the guard interface, locating the guard service at a secure region, and locating the guard interface at a secure address at the secure region.

Example implementations also include accessing a secure service at a secure region of a processing system, from an application at a system region of the processing system, by obtaining a service request associated with a secure service, validating a service parameter associated with service request, generating a secure service parameter based at least partially on the service parameter, generating a guard request based at least partially on the secure service parameter, generating a secure request based at least partially on the guard request, and processing the secure request at the secure service.

Example implementations also include a device with a processor and a secure memory operatively coupled to the processor. In some implementations, the secure memory includes a guard service object configured to obtain a service request associated with a secure service, validate a service parameter associated with service request, generate a secure service parameter based at least partially on the service parameter, and generate a guard request based at least partially on the secure service parameter, and a secure service object configured to generate a secure request based at least partially on the guard request, and process the secure request at the secure service.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

Figure 1:
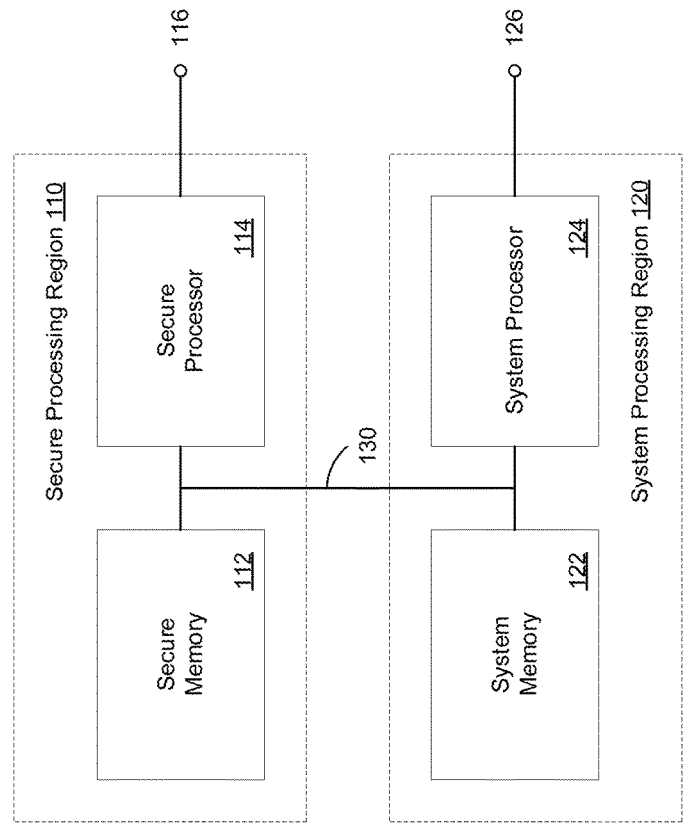
FIG. 1 illustrates an example processing system in accordance with present implementations.

FIG. 1 illustrates an example processing system in accordance with present implementations. As illustrated by way of example in FIG. 1, an example system 100 includes a secure processing region 110, a system processing region 120, and a system bus. In some implementations, the secure processing region 110 includes a secure memory 112, a secure processor 114, and a secure communication channel 116. In some implementations, the system processing region 120 includes a secure memory 122, a secure processor 124, and a secure communication channel 126. In some implementations, at least one of the secure region 110 and the system region 120 includes an electronic circuit board, printed circuit board, conductive substrate, or the like. In some implementations, the secure memory 112 and the system memory 122 are distinct memory devices or the like. Alternatively, in some implementations, the secure memory 112 and the system memory 122 are an integral device, a plurality of integrated devices, a plurality of coupled devices, or the like, logically separated respectively into a secure portion and a system portion. In some implementations, the secure processor 114 and the system processor 124 are distinct memory devices or the like. Alternatively, in some implementations, the secure processor 114 and the system processor 124 are an integral device, a plurality of integrated devices, a plurality of coupled devices, or the like, logically separated respectively into a secure portion and a system portion.

The secure memory 112 is operable to store data associated with the secure processing region 110. In some implementations, the secure processing region 110 limits or prevents access to at least a portion of the secure memory 112 from the system processing region 120. In some implementations, the secure processing region 110 limits or prevents direct addressing of at least a portion of the secure memory 112 from the system processing region 120. In some implementations, the secure memory 112 includes ones or more hardware memory devices for storing binary data, digital data, or the like. In some implementations, the secure memory 112 includes one or more electrical components, electronic components, programmable electronic components, reprogrammable electronic components, integrated circuits, semiconductor devices, flip flops, arithmetic units, or the like. In some implementations, the secure memory 112 includes at least one of a non-volatile memory device, a solid-state memory device, a flash memory device, and a NAND memory device. In some implementations, the secure memory 112 includes one or more addressable memory regions disposed on one or more physical memory arrays. In some implementations, a physical memory array includes a NAND gate array disposed on a particular semiconductor device, integrated circuit device, printed circuit board device, and the like.

The secure processor 114 is operable to execute one or more instructions associated with the secure processing region 110. In some implementations, the secure processor 114 limits or prevents access to at least a portion of the secure memory 112 from the system processing region 120. In some implementations, the secure processor 114 limits or prevents direct addressing of at least a portion of the secure memory 112 from the system processing region 120. In some implementations, the secure processor 114 is operable to perform one or more processing operations associated with restricted or preventing access to the secure processing region 110. In some implementations, the secure processor is operatively coupled to the system bus 130. In some implementations, the secure processor 114 includes one or more devices in accordance with the system processor 124.

The secure communication channel 116 is operable to communicatively couple the secure processor 114 to one or more external devices, systems, or the like. In some implementations, external devices, system, or the like include integrated circuits, communication ports, communication port controllers, serial interfaces, USB interfaces, USB-C interfaces, I2C interfaces, and the like. The secure communication channel 116 is operable to communicate one or more instructions, signals, conditions, states, or the like between one or more of the secure processor 114 and the external devices, systems, or the like. In some implementations, the secure communication channel 116 includes one or more digital, analog, or like communication channels, lines, traces, or the like operable independently of the system processing region 120 and any component thereof. In some implementations, the secure processing region 110 includes one or more registers, switches, or the like, to assign, associate, couple, or the like, one or more external devices to the secure communication channel 116. In some implementations, the secure processing region 110 includes one or more registers, switches, or the like, to assign, associate, couple, or the like, one or more portions of external devices to the secure communication channel 116. As one example, a portion of an external device is a single serial communication line among multiple serial communication lines of a serial communication interface, and the secure processing region 110 is operable to couple the single line or a subset of the lines to the secure communication channel 116.

The system memory 122 is operable to store data associated with the system processing region 120. In some implementations, the system memory 122 includes ones or more hardware memory devices for storing binary data, digital data, or the like. In some implementations, the system memory 122 includes one or more electrical components, electronic components, programmable electronic components, reprogrammable electronic components, integrated circuits, semiconductor devices, flip flops, arithmetic units, or the like. In some implementations, the system memory 122 includes at least one of a non-volatile memory device, a solid-state memory device, a flash memory device, and a NAND memory device. In some implementations, the system memory 122 includes one or more addressable memory regions disposed on one or more physical memory arrays. In some implementations, a physical memory array includes a NAND gate array disposed on a particular semiconductor device, integrated circuit device, printed circuit board device, and the like.

The system processor 124 is operable to execute one or more instructions associated with the system processing region 120. In some implementations, the system processor 124 is an electronic processor, an integrated circuit, or the like including one or more of digital logic, analog logic, digital sensors, analog sensors, communication buses, volatile memory, nonvolatile memory, and the like. In some implementations, the system processor 124 includes but is not limited to, at least one microcontroller unit (MCU), microprocessor unit (MPU), central processing unit (CPU), graphics processing unit (GPU), physics processing unit (PPU), embedded controller (EC), or the like. In some implementations, the system processor 124 includes a memory operable to store or storing one or more instructions for operating components of the system processor 124 and operating components operably coupled to the system processor 124. In some implementations, the one or more instructions include at least one of firmware, software, hardware, operating systems, embedded operating systems, and the like. It is to be understood that the system processor 124 or the system processing region 120 generally can include at least one communication bus controller to effect communication between the system processor 124 and the other elements of the system processing region 120.

The system communication channel 126 is operable to communicatively couple the system processor 124 to one or more external devices, systems, or the like. In some implementations, external devices, system, or the like include integrated circuits, communication ports, communication port controllers, serial interfaces, USB interfaces, USB-C interfaces, I2C interfaces, and the like. The system communication channel 126 is operable to communicate one or more instructions, signals, conditions, states, or the like between one or more of the system processor 124 and the external devices, systems, or the like. In some implementations, the system communication channel 126 includes one or more digital, analog, or like communication channels, lines, traces, or the like operable independently of the secure processing region 110 and any component thereof. In some implementations, the system processing region 120 includes one or more registers, switches, or the like, to assign, associate, couple, or the like, one or more external devices to the system communication channel 126. In some implementations, the system processing region 120 includes one or more registers, switches, or the like, to assign, associate, couple, or the like, one or more portions of external devices to the system communication channel 126. As one example, a portion of an external device is a single serial communication line among multiple serial communication lines of a serial communication interface, and the system processing region 120 is operable to couple the single line or a subset of the lines to the system communication channel 126.

The system bus 130 is operable to communicate one or more instructions, signals, conditions, states, or the like between one or more of the secure processing 110 and the system processing region 120, including the secure processor 114, the secure memory 112, the system memory 122, and the system processor 124. In some implementations, the system bus 130 includes one or more digital, analog, or like communication channels, lines, traces, or the like. In some implementations, the system bus 130 is operatively coupled to, operably couplable with, or the like, one or more of the secure communication channel 116 and the system communication channel 126.

Figure 2:
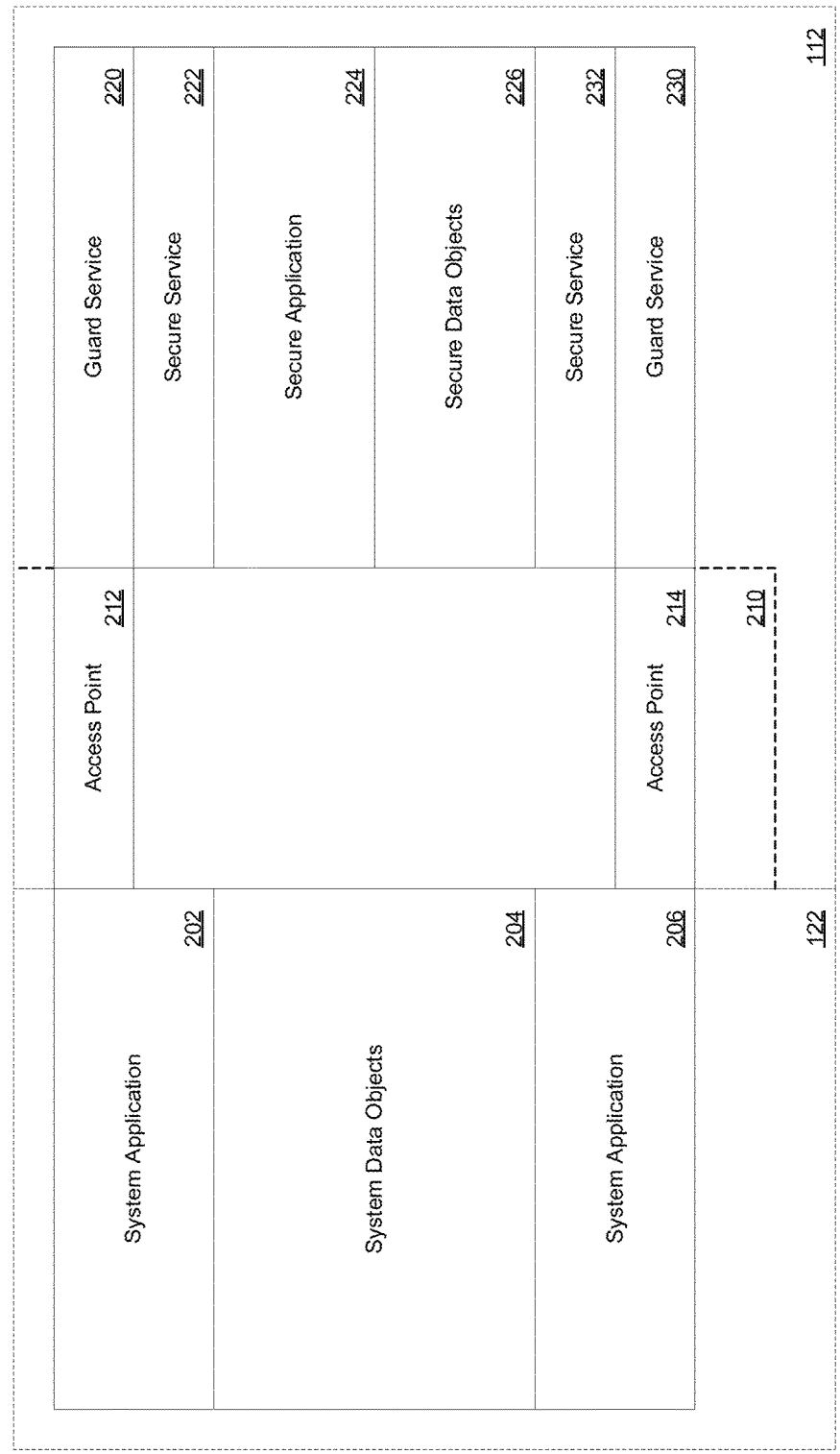
FIG. 2 illustrates an example non-transitory memory system further to the example processing system of FIG. 1.

FIG. 2 illustrates an example non-transitory memory system further to the example processing system of FIG. 1. As illustrated by way of example in FIG. 2, an example non-transitory memory system 200 includes a system memory region, a secure memory region, and a secure access region 210 of the secure memory region. In some implementations, the secure access region 210 includes access points 212 and 214. In some implementations, the example memory system 200 includes one or more of the secure memory 112 and the system memory 122 respectively as the secure memory region and the system memory region. In some implementations, the secure access region 210 is a logical or physical region of the secure memory 112. In some implementations, the secure access region is a contiguous logical memory area of the secure memory 112. In some implementations, at least a portion of the secure access region is directly addressable by the system processing region 120 or one or more components thereof, including but not limited to the system memory 122 and the system processor 124. By way of example, the example memory of FIG. 2 is illustrated as having a plurality of contiguous blocks, but is not limited thereto.

In some implementations, at least one of the secure memory 112 and the secure processor 114 enforces addressing restrictions of the secure access region. In some implementations, the secure memory region includes system applications 202 and 206, and system data objects 204. In some implementations, the secure memory region includes guard services 220 and 230, secure service 222 and 232, a secure application 224, and secure data objects 226. In some implementations, one or more of the system applications 202 and 206, the system data objects 204, the guard services 220 and 230, the secure services 222 and 232, the secure application 224, and the secure data objects 226 include one or more instructions generated based on at least one high-level computer language.

The system application 202 is operable to execute one or more instructions at the system processing region 120 and in communication with the secure processing region 110. In some implementations, the system application 202 includes one or more instructions generated at an external compiler and transferred to the system memory 122 of the system processing unit 120 by the system communication channel 126. In some implementations, the system application 202 is communicatively coupled to the guard service 220 by the access point 212. In some implementations, at least one of the secure memory 112 and the secure processor 114 restricts access by the system application 202 to one or more addresses associated with the access point 212. Thus, in some implementations, the system application 202 is able to access the guard service 220 only at the one or more addresses associated with the access point 212. The system data objects 204 include one or more structures, records, references, or the like accessible to one or more of the system application 202, the system application 206, and the system processor 124. As one example, system data objects include configuration files, cache files, databases, alphanumeric values, hexadecimal values, and pointers. In some implementations, one or more of the system applications 202 and 206 have at least partial access to at least one of the system data objects 204.

The access point 212 is operable to grant access to one or more addresses associated with the secure memory 112. In some implementations, at least one of the secure memory 112 and the secure processor 114 restricts access by the one or more of the system memory 122 and the system processor 124 to the secure memory 112 at addresses or address ranges corresponding to at least one of the access point 212 and the guard service 220. In some implementations, at least one of the secure memory 112 and the secure processor 114 generates the access point 212 in accordance with a hardware restriction on one more addresses or address ranges associated with the secure memory 112. In some implementations, at least one of the secure memory 112 and the secure processor 114 generates the access point 212 by overriding, replacing, removing, or the like, a hardware restriction on one more addresses or address ranges associated with the secure memory. In some implementations, the access point 212 is a modifiable access restriction to one or more addresses or address ranges of the secure memory 112, and is not limited to any hardware restriction associated with those addresses or address ranges.

The guard service 220 includes one or more instructions for communicatively coupling the system application 202 to the secure service 222. In some implementations, the guard service 220 includes an application programming interface (API) based at least partially on an API associated with the secure service 222. In some implementations, the guard service 220 includes a subset of functions, operations, instructions, or the like, included with the secure service 222. As one example, a guard function 220 can include an API function header associated with the secure service 222 that passes arguments received to a like API function header of the secure service 222. Alternatively, in some implementations, the guard service 220 is directly communicatively coupled to the system application 202 in the absence of an access point 212 restricting addressing of the secure access region 210 of the secure memory 112. In some implementations, the guard service 220 restricts transfer of data from the system processing region 120 to the secure processing region 110, from the secure processing region 110 to the system processing region 120, or a combination thereof. In some implementations, the guard service 220 is operable to authenticate one or more of the system applications 202 and 206.

In some implementations, the guard service 220 is operable to authorize one or more of the system applications 202 and 206 to access the secure service 222. In some implementations, the guard service 220 includes one or more API operations associated with the secure service 222 and includes modified instructions associated with one or more of the API operations associated with the secure service 222. As one example, a guard function 220 can include an API function header associated with the secure service 222 and that returns a void, zero, false, true, null or like value. In some implementations, the guard service 220 does not include one or more API operations associated with the secure service 222. The secure service 222 includes one or more instructions for communicatively coupling the guard service 220 to one or more of the secure application 224 and the secure data objects 226. In some implementations, the secure service 222 includes one or more functions, operations, instructions, or the like, operable to perform operations within the secure memory 112, and to access the secure application 224 and the secure data objects 226. In some implementations, the secure service includes one or more API function headers restricted from use outside of the secure memory 112.

The secure application 224 is operable to execute one or more instructions at the secure processing region 110 and in communication with the system processing region 120. In some implementations, the secure application 224 includes one or more instructions generated at an external compiler and transferred to the system memory 122 of the system processing unit 120 by the system communication channel 126. In some implementations, the secure application 224 is immutably stored at the secure memory 112. In some implementations, at least one of the secure memory 112 and the secure processor 114 restricts the system processing region 120 or any component thereof from modifying, accessing, or the like, the secure application 224. In some implementations, the secure application 224 is communicatively coupled to one or more of the secure service 222 and the secure data objects 226. The secure data objects 226 include one or more structures, records, references, or the like accessible to one or more of the guard service 220, the secure service 222, and the secure application 224. As one example, system data objects include configuration files, cache files, databases, alphanumeric values, hexadecimal values, and pointers. In some implementations, one or more of the system applications 202 and 206 have at least partial access to at least one of the system data objects 204.

The system application 206 is operable to execute one or more instructions at the system processing region 120 and in communication with the secure processing region 110, in accordance with the operation and operability of the system application 202. In some implementations, the system application 206 is distinct from and independent of the system application 202. In some implementations, the system application is operable in a processor thread of the system processor 124 distinct from a processor thread of the system processor 124 associated with the system application 202. In some implementations, the system application 206 is communicatively coupled to the guard service 230 by the access point 214.

The access point 214 is operable to grant access to one or more addresses associated with the secure memory 112. In some implementations, at least one of the secure memory 112 and the secure processor 114 restricts access by the one or more of the system memory 122 and the system processor 124 to the secure memory 112 at addresses or address ranges corresponding to at least one of the access point 214 and the guard service 230. In some implementations, at least one of the secure memory 112 and the secure processor 114 generates the access point 214 in accordance with generation of the access point 212. In some implementations, the access point 214 is a modifiable access restriction to one or more addresses or address ranges of the secure memory 112, and is not limited to any hardware restriction associated with those addresses or address ranges.

The guard service 230 includes one or more instructions for communicatively coupling the system application 206 to the secure service 232. In some implementations, the guard service 230 includes an API based at least partially on an API associated with the secure service 232. In some implementations, the guard service 230 includes a subset of functions, operations, instructions, or the like, included with the secure service 232. As one example, a guard function 230 can include an API function header associated with the secure service 232 that passes arguments received to a like API function header of the secure service 232. Alternatively, in some implementations, the guard service 230 is directly communicatively coupled to the system application 206 in the absence of an access point 214 restricting addressing of the secure access region 210 of the secure memory 112. In some implementations, the guard service 230 restricts transfer of data from the system processing region 120 to the secure processing region 110, from the secure processing region 110 to the system processing region 120, or a combination thereof. In some implementations, the guard service 230 is operable to authenticate one or more of the system applications 202 and 206. In some implementations, the guard service 230 is operable to authorize one or more of the system applications 202 and 206 to access the secure service 232. In some implementations, the guard service 230 includes one or more API operations associated with the secure services correspondingly to the guard service 220. The secure service 222 includes one or more instructions for communicatively coupling the guard service 220 to one or more of the secure application 224 and the secure data objects 226 correspondingly to the secure service 222.

Figure 3:
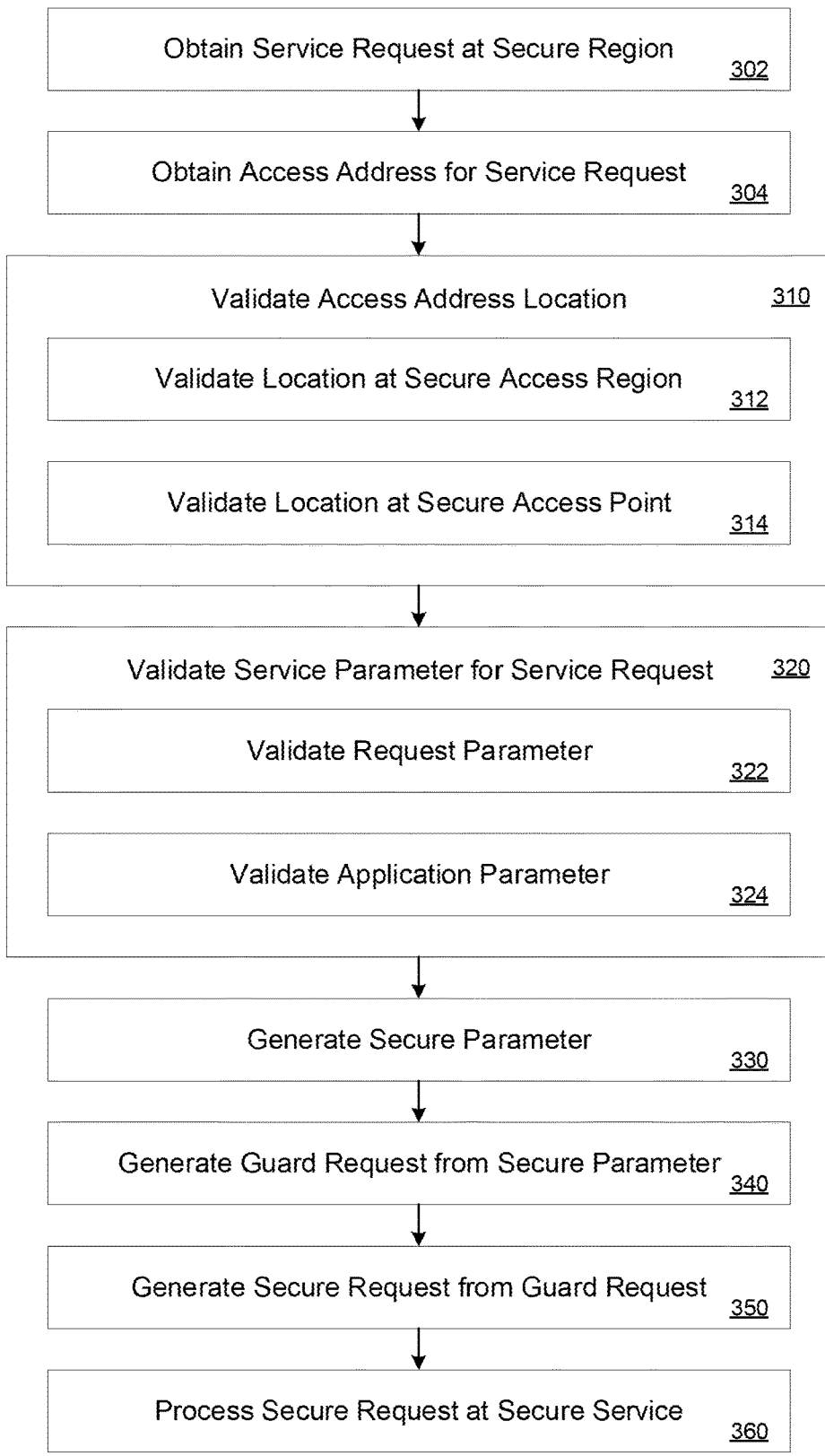
FIG. 3 illustrates an example method of generating a guard service for a secure service in accordance with present implementations.

FIG. 3 illustrates an example method of generating a guard service for a secure service in accordance with present implementations. In some implementations, at least one of the example processing system 100 and the example memory system 200 performs method 300 according to present implementations. In some implementations, the method 300 begins at step 302.

At step 302, an example system obtains a request at a secure region of a processing system. In some implementations, the secure processor 114 obtains the request from the system processor 124. In some implementations, the example system obtains the request at an address associated with the secure memory 112. The method 300 then continues to step 304. At step 304, the example system obtains an access address associated with the service request. In some implementations, at least one of the secure memory 112 and the secure processor 122 obtains the access address. In some implementations, the access address includes one or more physical or logical memory locations associated with one or more of the secure memory 112 and the secure access region 210. The method 300 then continues to step 310.

At step 310, the example system validates an address location associated with the access address. In some implementations, at least one of the secure memory 112 and the secure processor 114 validates the address location. In some implementations, at least one of the secure memory 112 and the secure processor 114 restricts or permits access to the secure memory 112 and any component thereof based on validating the address location. In some implementations, at least one of the secure memory 112 and the secure processor 114 rejects the request and ends method 300 if the address location is not validated, and allows method 300 to continue if the address location is validated. In some implementations, step 310 includes at least one of step 312 and 314. At step 312, the example system validates the address location with a secure access region location. In some implementations, the example system validates the address location by determining whether the address location matches an address or range of addresses associated with the secure access region 210 of the secure memory 112. At step 314, the example system validates the address location with the secure access point location. In some implementations, the example system validates the address location by determining whether the address location matches an address or range of addresses associated with at least one of the access points 212 and 214. The method 300 then continues to step 320.

At step 320, the example system validates a service parameter for the service request. In some implementations, a service parameter includes one or more arguments, variables, references, identifiers, objects, or the like obtained through an API between the secure processing region 110 and the system processing region 120. In some implementations, at least one of the secure memory 112 and the secure processor 114 restricts or permits access to the secure memory 112 and any component thereof based on validating the service. In some implementations, at least one of the secure memory 112 and the secure processor 114 rejects the request and ends method 300 if the service parameter is not validated, and allows method 300 to continue if the service parameter is validated. Alternatively, in some implementations, at least one of the secure memory 112 and the secure processor 114 flags the request for modification if the service parameter is not validated, and allows method 300 to continue whether or not the service parameter is validated.

In some implementations, step 320 includes at least one of steps 322 and 324. At step 322, the example system validates a request parameter. In some implementations, a request parameter includes one or more of the system data objects 204, one or more intermediary objects derived from the system data objects 204, and the like. In some implementations, the example system validates the request parameter by determining whether the request parameter is authorized to be communicated with or from the secure memory 112. As one example, the example system can validate a read request parameter from the secure memory 112 and can decline to validate a write request parameter to the secure memory 112. At step 324, the example system validates an application parameter. In some implementations, an application parameter includes one or more identifier objects, authentication objects, tokens, keys, and the like, associated with one or more of the system applications 204 and 206. In some implementations, the example system validates the application parameter by determining whether the application parameter is associated with an application authorized to make the obtained requested from the secure memory 112. As one example, the example system can validate an application parameter associated with a system application if that particular system application, class of application, or the like, is authorized to access the requested service, and can otherwise decline to validate the application parameter. The method 300 then continues to step 330.

At step 330, the example system generates a secure parameter. In some implementations, the secure processor 114 generates the secure parameter. In some implementations, the example system generates the secure parameter based on a data transmission restriction. As one example, a data transmission restriction includes a buffering restriction preventing buffering within the secure memory 112, and the example system generates a secure parameter pointing to a buffer in a system memory 122. As another example, a data transmission restriction includes a pointer restriction preventing transmitting pointers addressed to the system memory 122 to the secure memory 112, and the example system generates a secure parameter including a copy of the referenced object. As another example, a data transmission restriction includes a quantity restriction preventing transmitting more than a particular number of API function arguments from the system memory 122 to the secure memory 112, and the example system generates a secure parameter including a plurality of intermediary functions each including a number of arguments below the quantity restriction. The method 300 then continues to step 340.

At step 340, the example system generates a guard request based on the secure parameter. In some implementations, the secure processor 124 generates the guard request. In some implementations, the guard request is associated with a guard service. In some implementations, the guard request includes an API function call derived from the service request. In some implementations, the guard request includes one or more service parameters associated with the service request. In some implementations, the guard request includes one or more secure parameters modifying or replacing one or more of the service parameters. The method 300 then continues to step 350. At step 350, the example system generates a secure request based on the guard request. In some implementations, the secure processor 124 generates the secure request. In some implementations, the secure request is associated with a secure service. In some implementations, the secure request includes an API function call derived from the guard request. In some implementations, the service request includes one or more service parameters associated with the guard request. In some implementations, the service request includes one or more secure parameters associated with the guard request. The method 300 then continues to step 360.

At step 360, the example system processes the secure request at the secure service. In some implementations, the secure processor processes the secure service. In some implementations, the example system process the secure service by communicating with, accessing, modifying, or the like, one or more of the secure services 222 and 232, the secure application 224, and the secure data objects 226. In some implementations, the method 300 ends at step 360.

Figure 4:
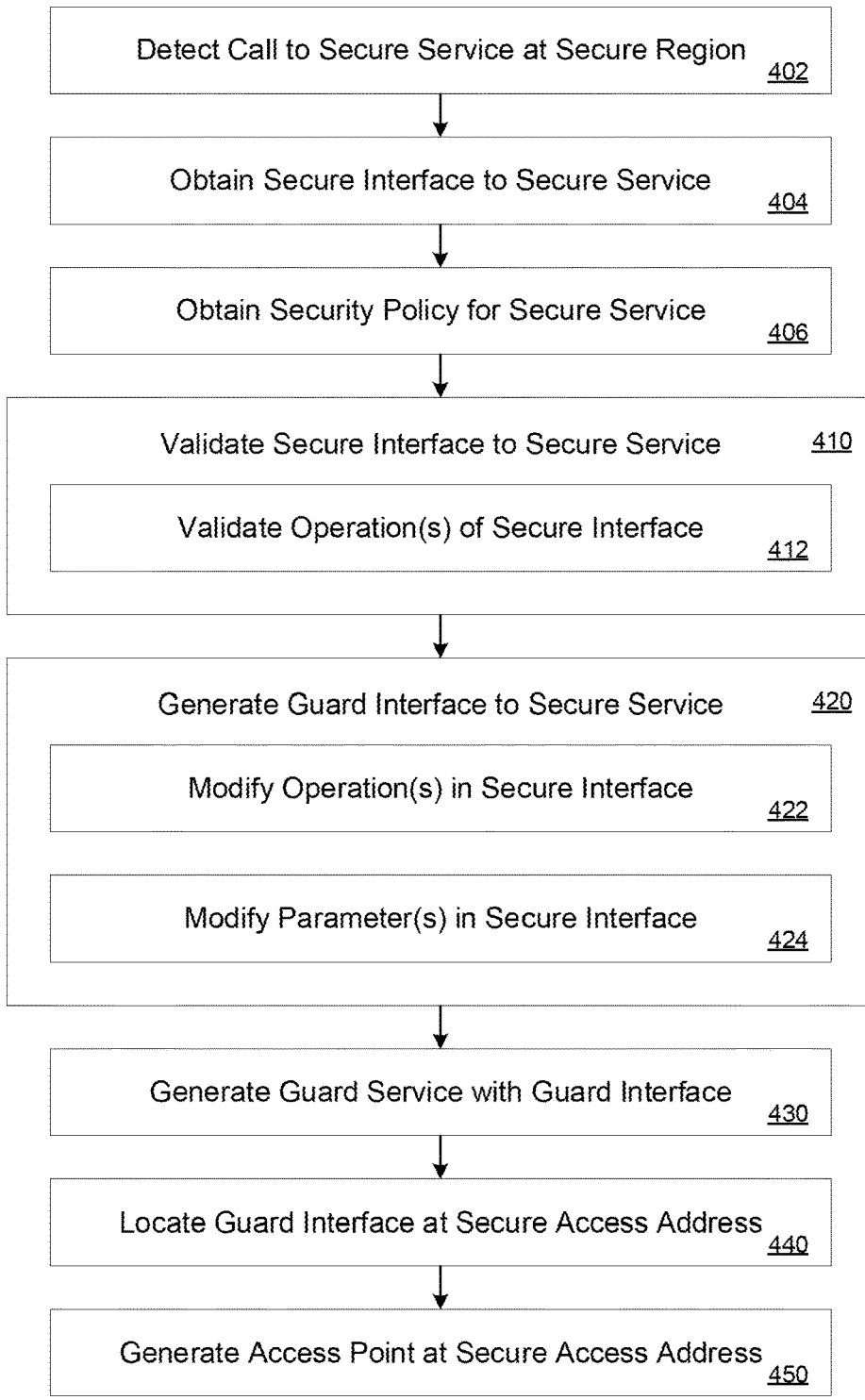
FIG. 4 illustrates an example method of accessing a secure service with a guard service in accordance with present implementations.

FIG. 4 illustrates an example method of accessing a secure service with a guard service in accordance with present implementations. In some implementations, a compiler device, system, or the like associated with at least one of the example processing system 100 and the example memory system 200 performs method 400 according to present implementations. In some implementations, the compiler device is operable to detect one or more conditions requiring generating, modifying, or the like, guard services and access points associated with particular applications. In some implementations, the method 400 begins at step 402.

At step 402, the example system detects a call to a secure service at a secure region. In some implementations, the exemplary system detects at least one instruction including a call from the system processing region 120 to the secure processing region 110, or from the secure processing region 110 to the system processing region 120. In some implementations, the call includes, but is not limited, to at least one of an API request from a system application to a secure service, an API response from a secure service to a system application, an API request from a secure service to a system data object, and the like. The method 400 then continues to step 404. At step 404, the example system obtains a secure interface associated with the secure service. In some implementations, the secure interface includes one or more API functions, and API function header file, or the like. In some implementations, the call includes an API request associated with one or more API functions associated with the secure interface. The method 400 then continues to step 406.

At step 406, the example system obtains a security policy associated with the secure service. In some implementations, the security policy includes one or more validation criteria associated with one or more secure parameters of the secure service. In some implementations, the validation criteria define conditions under which guard services are created for secure services. In some implementations, the validation criteria also define conditions under which access points are created for guard services. In some implementations, validation criteria include one or more of buffering restrictions, data transmission restrictions, access restrictions, and the like. In some implementations, access restrictions include, but are not limited to, preventing or limiting access to system application based on identifiers, keys, tokens, or the like associated therewith. In some implementations, the example system immutably stores validation criteria. The method 400 then continues to step 410.

At step 410, the example system validates the secure interface associated with the secure service. In some implementations, the example system validates the secure interface by determining whether the system processing region is authorized to access the secure service associated with the call under the validation criteria. In some implementations, the example system validates the secure interface by determining whether to a particular system application associated with the call is authorized to access the secure service associated with the call under the validation criteria. In some implementations, step 410 includes step 412. At step 412, the example system validates one or more operations associated with the secure interface. In some implementations, the example system validates the secure interface by determining whether at least one API function called by a particular system application is authorized to call the secure service under the validation criteria. In some implementations, the example system validates the secure interface by determining whether at least one API function called by a particular system application is authorized to call the secure service under the validation criteria. In some implementations, step 410 includes step 412. The method 400 then continues to step 420.

At step 420, the example system the example system generates a guard interface based on the secure service. In some implementations, the example system generates a guard interface including one or more validated portions of the secure interface. In some implementations, the example system generates the guard interface including only validated portions of the secure interface. In some implementations, the guard interface includes an API interface including one or more calls to corresponding functions, operations, or the like, of the secure interface. As one example, the example system can generate a guard API including only validated functions of the secure API. As another example, the example system can generate a guard API including only validated arguments of the secure API. In some implementations, the example system modifies the call to the secure service to instead call the guard service. Thus, the example system can automatically generate a guard service logically interposed between a calling system application and a called secure service. In some implementations, step 420 includes at least one of steps 422 and 424. At step 422, the example system modifies one or more operations associated with the secure interface. At step 424, the example system modifies one or more parameters associated with the secure interface. As one example, the example system replaces at least one service parameter associated with the call to the secure service with a secure parameter. The method 400 then continues to step 430. At step 430, the example system generates a guard service based on the guard interface. In some implementations, the guard service includes one or more operations, functions, or the like corresponding to the called secure service. The method 400 then continues to step 440.

At step 440, the example system locates the guard interface at a secure address. In some implementations, the example system locates the guard interface at a particular address or range of addresses at the secure memory 112. In some implementations, the particular address or range of addresses is designated for allowing access by a system application from the system processing region. The method 400 then continues to step 450. At step 450, the example system generates an access point at the secure access address. In some implementations, the example system generates the access point by associating the secure access address or range of addresses with an access condition. In some implementations, the access condition allows one or more of a system application, the system memory 122, and the system processor 124 to directly address the secure memory 112 at the secure access address. In some implementations, the access point overrides a default condition restricting or preventing access to any portion of the secure access region 210 or the secure memory 112 from the system application, the system memory 122, and the system processor 124 In some implementations, the method 400 ends at step 450.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method of generating a guard service for a secure region of a system, the method comprising:
    detecting a call by an application executable by a system processor to a secure service executable by a secure processor at a secure memory region of a secure memory having access thereof restricted to the secure processor,
    the system processor, the secure region, and the secure memory integrated into a processing device;
        generating a guard interface including a validated portion of a secure interface associated with the secure service;
        generating a guard service based at least partially on the guard interface;
            locating the guard service at the secure memory region;
            locating the guard interface at a secure address of the secure memory region; and
        generating an access point at the secure address by associating the secure address with an access condition allowing the system processor to directly access the secure address.

2. The method of claim 1, further comprising:
    obtaining a security policy associated with the secure service and including an access restriction associated with the secure region; and
    validating the secure interface based at least partially on the access restriction.

3. The method of claim 2, wherein the validating the secure interface further comprises restricting the call from accessing an operation of the secure interface.

4. The method of claim 2, wherein the validating the secure interface comprises restricting the secure service from accessing data outside the secure region.

5. The method of claim 1, wherein the generating the guard interface further comprises generating the guard interface by modifying at least one operation associated with the secure interface.

6. The method of claim 5, wherein the modifying the at least one operation further comprises modifying at least one parameter associated with the at least one operation.

7. The method of claim 1, further comprising:
    generating the access point to override a default condition restricting or preventing access to a portion of a secure access region of the secure memory region,
    wherein the secure address is addressable from a system region of the processing device.

* * * * *